United States Patent

[11] 3,586,143

| [72] | Inventor | Phillip Hutchinson<br>Birmingham, England |
|---|---|---|
| [21] | Appl. No. | 839,459 |
| [22] | Filed | July 7, 1969 |
| [45] | Patented | June 22, 1971 |
| [73] | Assignee | G.K.N. Birfield Transmissions Limited<br>Erdington, Birmingham, England |
| [32] | Priority | July 5, 1968 |
| [33] | | Great Britain |
| [31] | | 32107/68 |

[54] REVERSIBLE ROLLER CLUTCH
8 Claims, 2 Drawing Figs.

[52] U.S. Cl. .................................... 192/44,
192/47
[51] Int. Cl. .................................... F16d 41/06,
F16d 41/10
[50] Field of Search .......................... 192/27, 38,
44, 45, 47; 81/59.1

[56] References Cited
UNITED STATES PATENTS

| 247,669 | 9/1881 | Mallett et al. | 192/44 X |
| 2,001,668 | 5/1935 | Maier | 192/44 |
| 3,084,774 | 4/1963 | Liang | 192/44 |
| 3,119,480 | 1/1964 | Fuchs | 192/44 |

Primary Examiner—Allan D. Herrmann
Attorney—Young & Thompson

ABSTRACT: A clutch comprising inner and outer clutch members between which is disposed a pair of rolling members each of which is urged to a wedging position in which it prevents relative displacement or rotation of the clutch members in a corresponding one of the two possible directions of relative rotation, but allows relative rotation in the other of such direction, and means operative to displace one or other of the rolling members from its respective wedging position whereby the clutch is freed for relative displacement or rotation of the clutch members in one or other of said directions.

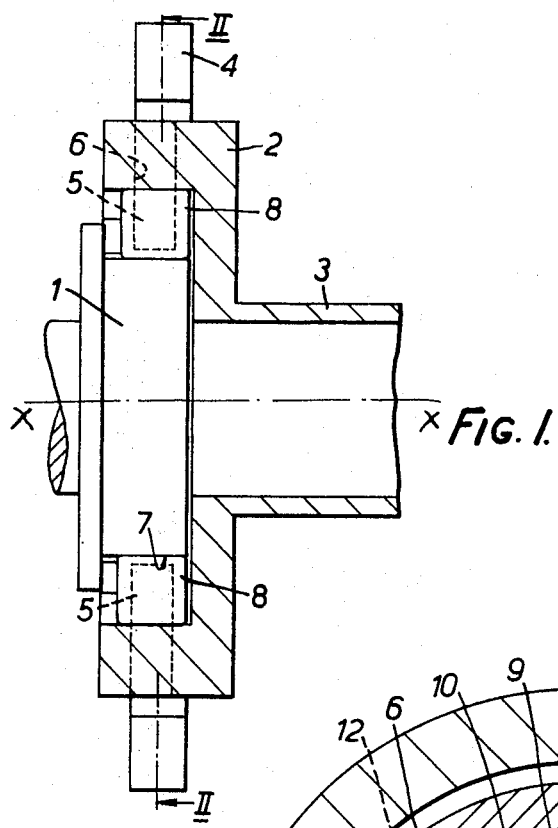
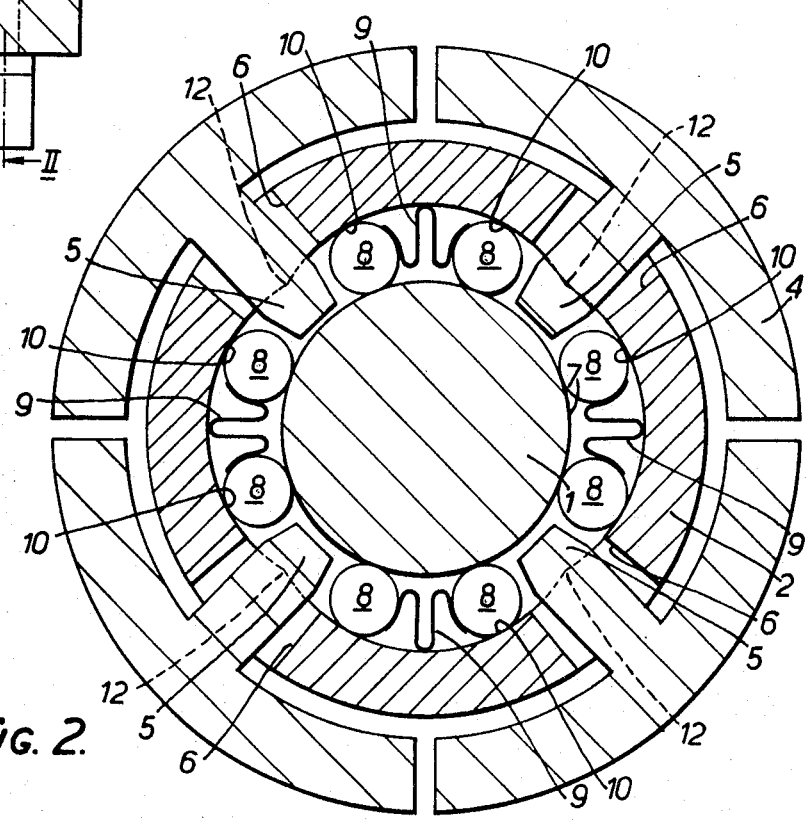

REVERSIBLE ROLLER CLUTCH

This invention relates to clutches and more particularly to clutches employing rolling members which act to couple two drive members of the clutch with a wedging action and which may be freed from wedging engagement to allow relative rotational movement between the members.

Such clutches are normally single acting in the sense that they couple the members in one rotational direction only and operate as a free wheel in the opposite direction, and the object of the invention is to provide a clutch which is double acting but can be freed for relative rotation or displacement of the members in either direction.

According to the invention a clutch comprises inner and outer clutch members between which are disposed a pair of rolling members each of which is urged to a wedging position in which it prevents relative displacement or rotation of the clutch members in a corresponding one of the two possible directions of relative rotation, but allows relative rotation in the other of such directions, and means operative to displace one or other of the rolling members from its respective wedging position whereby the clutch is freed for relative displacement or rotation of the clutch members in one or other of said directions.

The rolling members are preferably cylindrical rollers and they are accordingly hereinafter referred to as "rollers," where appropriate this term being intended to include other suitable forms of rolling members, such as balls. A clutch in accordance with the invention is very conveniently used to lock one of the clutch members against rotation in both directions unless one of the clutch rollers is displaced from the wedging position, the other clutch member being fixed. In such cases the clutch may alternatively be considered as operating as a brake, or as a lockable free wheel, and the term "clutch" as used herein is still intended to cover such constructions.

In a preferred construction the inner member is in the form of a central cylindrical hub and the outer member is of sleevelike form with a plurality of pairs of rollers disposed between the two members. The two rollers of each pair may be urged apart to their respective wedging positions by an associated spring disposed between them, one roller of each pair being displaced against the spring loading from its wedging position to free the clutch for relative rotation of the members in a corresponding direction when said means are operative.

Said means may take the form of an external release ring having a plurality of inwardly projecting radial fingers, which correspond in number the the number of pairs of rollers, and each of which projects through a corresponding one of a plurality of radially extending apertures in the outer member.

The arrangement is preferably such that each two adjoining pairs of rollers are separated by an associated finger so that angular movement of the release ring relative to the outer member from a central position, which corresponds to a fully engaged condition of the clutch, causes movement of one roller of each pair of rollers and thereby frees the clutch for relative movement of the inner and outer members in the corresponding direction. It will be appreciated that relative rotation of the two members in the opposite direction is prevented by the wedging engagement of the other roller of each pair which remains in wedging engagement.

The invention will now be further described with reference to the accompanying drawings which show, by way of example, a double-acting roller clutch in accordance with the invention.

In the drawings

FIG. 1 is a longitudinal sectional view of the clutch, in the fully engaged condition, along the aligned rotational axes of inner and outer members of the clutch, and FIG. 2 is a sectional view on the line II–II of FIG. 1.

The rotatably mounted inner and outer members are respectively in the form of a central hub 1 and a surrounding open-ended cylinder 2, one end of the latter being integrally formed with a reduced diameter sleeve portion 3. The cylinder 2 is surrounded by a release ring 4 having four equiangularly spaced and inwardly projecting fingers 5 each of which extends with clearance in the circumferential direction through a corresponding one of four radial apertures 6 formed in the wall of the cylinder 2, with the inner end of each finger terminating close to the cylindrical external surface 7 of the hub 1. The cylinder 2 surrounds the hub 1 with radial clearance, and between each of two adjacent fingers 5 there is disposed a pair of clutch rollers 8 so that there are four pairs of such rollers symmetrically disposed around the rotational axis X-X of the clutch. Each of the fingers 5 is formed integrally with a corresponding segment of the release ring, which is thus split into four segments for ease of assembly, as shown in FIG. 2.

A corresponding one of four W-shaped springs 9 is positioned between the rollers 8 of each pair with the side limbs of the spring in contact with the rollers 8 so that each roller is urged away from the other of the pair and towards the adjacent finger 5. The inner periphery of the cylinder is formed with four pairs of wedge surfaces 10 respectively associated with the four pairs of rollers 8 and, in the fully engaged condition of the clutch shown in the drawings, each roller 8 of each pair is urged by the corresponding spring 9 into wedging engagement between the external surface 7 of the hub 1 and the corresponding wedge surface 10 on the outer cylinder 2. Each wedge surface 10 merges smoothly with the basic cylindrical shape of the inner periphery of the cylinder 2 adjacent the corresponding roller 8 and terminates, with the adjacent wedge surface 10, at an inwardly projecting peak 12 a central portion of which is cut away where the corresponding aperture 6 breaks through the inner peripheral surface of the cylinder 2.

The dimensions of the radial appertures 6 in the outer cylinder 2 are such as to allow a certain degree of relative angular displacement, from a central position, of the outer release ring 4 relative to the outer cylinder 2. The center position of the release ring corresponds to the fully engaged condition of the clutch in which the inner and outer members 1 and 2 are locked solid by the wedging engagement of the rollers 8. Angular movement of the release ring 4 with respect to the outer cylinder 2 in one direction displaces one roller 8 of each pair from its wedging position so as to free the clutch for relative angular displacement of the members in one direction, while still precluding relative angular displacement in the other direction. Thus, it will be appreciated that the clutch is double acting in the sense that it may be freed in either one of the two possible directions of relative displacement of the members 1 and 2, while preventing displacement in the other direction.

The clutch is of particular value in controlling the relative angular position of the inner and outer members 1 and 2 when the latter is subjected to cyclically varying torque reversals. In such an application, the torque acting on the outer member 2 in one direction can be utilized to effect relative displacement of the members 1 and 2 while the clutch remains locked against displacement in the other direction, so that the desired degree of relative rotation between the members is achieved by a stepwise relative rotation of the members 1 and 2 during the appropriate half cycle of the periodic torque reversals and so long as one roller 8 of each pair is freed by the release ring 4.

As an alternative to forming the wedge surfaces 10 on the cylinder 2, they may be formed on the hub 1, in which case the fingers project radially outwardly through slots or apertures in the hub 1.

I claim:

1. A clutch comprising inner and outer clutch members, at least one pair of rolling members disposed wedging position in which it prevents relative displacement or rotation of the clutch members in a corresponding one of the two possible directions of relative rotation, but allows relative rotation in the other of such directions, and means operative to displace one or other of the rolling members of each pair from respective wedging position whereby the clutch is freed for relative displacement or rotation of the clutch members in one or other of said directions, said means taking the form of a release ring having at least one projecting radial finger, the number of fingers corresponding to the number of pairs of rolling members, each finger projecting through a radial through slot or aperture in one of the clutch members for operative engagement with at least one of the rolling members.

2. A clutch according to claim 1, wherein the number of through slots or apertures corresponds to the number of fingers and each finger is arranged for alternative engagement with two of said rolling members respectively operable to prevent relative rotation of the clutch members in said two directions.

3. A clutch according to claim 1, wherein the rolling members are cylindrical rollers.

4. A clutch according to claim 1, wherein the clutch members rotate, with the inner member in the form of a cylindrical hub and the outer member of sleevelike form.

5. A clutch according to claim 1, wherein the two rollers of each pair are urged apart to their respective wedging positions by an associated spring disposed between them, one roller of each pair being displaced against the spring loading from its wedging position to free the clutch for relative rotation of the members in a corresponding direction when said means are operative.

6. A clutch according to claim 1 comprising a plurality of pairs of rollers, wherein the arrangement is such that each two adjoining pairs of rolling members are separated by a single associated finger so that angular movement of the release ring relative to said one member from a central position, which corresponds to a fully engaged condition of the clutch, causes movement of one rolling member of each pair and thereby frees the clutch for relative movement of the inner and outer members in the corresponding direction.

7. A clutch according to claim 1, wherein each of the fingers is integrally formed with a corresponding segment of the release ring, for ease of assembly.

8. A clutch according to claim 1, wherein the release ring is arranged externally of the outer member which is formed with said radial slots or apertures.